United States Patent
Choi et al.

(10) Patent No.: US 7,050,131 B2
(45) Date of Patent: May 23, 2006

(54) LIQUID CRYSTAL DISPLAY DEVICE HAVING BLACK SEAL PATTERN AND EXTERNAL RESIN PATTERN, AND METHOD OF FABRICATING THE SAME

(75) Inventors: Kee-Seok Choi, Gyeongsangbuk-do (KR); Joo-Yeon Yun, Busan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 28 days.

(21) Appl. No.: 10/407,419

(22) Filed: Apr. 7, 2003

(65) Prior Publication Data

US 2004/0075801 A1   Apr. 22, 2004

(30) Foreign Application Priority Data

Oct. 17, 2002  (KR) .................. 10-2002-0063513
Dec. 7, 2002   (KR) .................. 2002-77612

(51) Int. Cl.
G02F 1/1333 (2006.01)
G02F 1/1343 (2006.01)
G02F 1/1339 (2006.01)

(52) U.S. Cl. .................. 349/110; 349/111; 349/141; 349/153; 349/190

(58) Field of Classification Search ............. 349/110, 349/111, 141, 153, 190
See application file for complete search history.

(56) References Cited

U.S. PATENT DOCUMENTS

| 5,598,285 A | 1/1997 | Kondo et al. ............. 349/39 |
| 5,739,880 A * | 4/1998 | Suzuki et al. ............. 349/110 |
| 5,739,888 A * | 4/1998 | Ogura et al. ............. 349/153 |
| 5,838,037 A | 11/1998 | Masutani et al. ............. 257/296 |
| 5,946,060 A | 8/1999 | Nishiki et al. ............. 349/48 |
| 5,990,987 A | 11/1999 | Tanaka ............. 349/43 |
| 6,028,653 A | 2/2000 | Nishida ............. 349/141 |
| 6,097,454 A | 8/2000 | Zhang et al. ............. 349/43 |
| 6,120,858 A * | 9/2000 | Hirano et al. ............. 428/1.53 |
| 6,124,910 A * | 9/2000 | Nishida et al. ............. 349/110 |
| 6,124,917 A * | 9/2000 | Fujioka et al. ............. 349/153 |
| 6,448,116 B1 | 9/2002 | Wong ............. 438/155 |
| 6,747,724 B1 * | 6/2004 | Onaka et al. ............. 349/149 |
| 2002/0047963 A1 * | 4/2002 | Youn et al. ............. 349/110 |
| 2003/0117573 A1 * | 6/2003 | Yi et al. ............. 349/158 |

FOREIGN PATENT DOCUMENTS

| JP | 02-139523 | * 5/1990 |
| JP | 06-273743 | * 9/1994 |
| JP | 9-5764 | 1/1997 |

(Continued)

OTHER PUBLICATIONS

Kiefer, R. et al., "In Plane Switching of Nematic Liquid Crystals", Japan Display, 1992, pp. 547-550.

(Continued)

*Primary Examiner*—Tarifur R. Chowdhury
(74) *Attorney, Agent, or Firm*—McKennna Long & Aldridge LLP

(57) ABSTRACT

A liquid crystal display (LCD) device includes an upper substrate, a lower substrate including an active area having a plurality of thin film transistors and a non-active area, a first resin black matrix beneath the upper substrate at a position corresponding to the active area, a black seal pattern along edges of the upper substrate, and a second resin black matrix between the active area and the black seal pattern.

22 Claims, 11 Drawing Sheets

FOREIGN PATENT DOCUMENTS

| | | |
|---|---|---|
| JP | 9-73101 | 3/1997 |
| JP | 11-295744 | * 10/1999 |

OTHER PUBLICATIONS

Oh-e, M. et al., "Principles and Characteristics of Electro-Optical Behaviour with In-Plane-Switching Mode", Asia Display, Oct. 16-18, 1995, pp. 577-580.

Ohta, M. et al., "Development of Super-TFT-LCDs with In-Plane Switching Display Mode", Asia Display, Oct. 16-18, 1995, pp. 707-710.

Matsumoto, S., et al., :"Display Characteristics of In-Plane-Switching (IPS) LCDs and a Wide-Viewing-Angle 14.5-in. IPS TFT-LCD", Euro Display, Oct. 1-3, 1996, pp. 445-448.

Wakemoto, H. et al., "An Advanced In-Plane-Switching Mode TFT-LCD", SID 97 Digest, 1997, pp. 929-932.

Lee, S.H. et al., "High Transmittance, Wide-Viewing-Angle Nematic Liquid Crystal Display Controlled by Fringe-Field Switching", Asia Display, Sep. 28-Oct. 1, 1998, pp. 371-374.

* cited by examiner

LIQUID CRYSTAL DISPLAY DEVICE HAVING BLACK SEAL PATTERN AND EXTERNAL RESIN PATTERN, AND METHOD OF FABRICATING THE SAME

The present invention claims the benefit of Korean Patent Applications Nos. 2002-63513 and 2002-77612, filed in Korea on Oct. 17, 2002 and Dec. 7, 2002, respectively, which are hereby incorporated by reference as if fully set forth herein.

BACKGROUND OF THE INVENTION

1. Field of the Invention

The present invention relates to a liquid crystal display (LCD) device and more particularly, to a liquid crystal display (LCD) device having a black seal pattern, an external resin pattern, and method of fabricating the same.

2. Discussion of the Related Art

Among the many types of flat panel display devices being currently developed, liquid crystal display (LCD) devices have been most commonly used for notebook and desktop computers because of their superior high resolution, color displaying ability, and quality of displayed images. In general, LCD devices make use of optical anisotropy and polarization properties of liquid crystal layer to display image data. The LCD devices have upper and lower substrates each having electrodes thereon and a liquid crystal layer interposed therebetween. The LCD devices display images by forming an electric field between the upper and lower substrates to align liquid crystal molecules, thereby controlling light transmissivity according to alignment of the liquid crystal molecules.

FIG. 1 is a plan view of a liquid crystal display (LCD) panel according to the related art. In FIG. 1, a liquid crystal display (LCD) device includes an array substrate 50 and a color filter substrate 60, wherein the array substrate 50 commonly has a larger area than the color filter substrate 60. A black matrix 65 is formed along edges of the color filter substrate 60, and a seal pattern 70 is formed on the black matrix 65. Although not shown in FIG. 1, liquid crystal material is injected into a space that is bounded by the seal pattern 70 between the array and color filter substrates 50 and 60. The liquid crystal display (LCD) device has active and non-active areas A1 and NA1 that are divided by the black matrix 65. For example, an area of the liquid crystal display (LCD) device that is surrounded by the black matrix 65 is the active area A1, and an outer area of the black matrix 65 is the non-active area NA1. The active area A1 is a region where images are actually displayed and includes a plurality of pixels. For simplicity, a black matrix has been omitted but is formed in a boundary of each pixel. A plurality of gate and data lines 52 and 53 are formed in the active area A1, and pixel regions (not shown) are defined by crossings of the gate and data lines 52 and 53. In addition, a thin film transistor (not shown) is formed at a position adjacent to the crossing of the gate and data lines 52 and 53. Gate and data pads 54 and 55 to which the gate and data lines are respectively connected are formed in marginal spaces of the array substrate 50, and are electrically connected to gate and data driving circuits (not shown), respectively.

FIG. 2 is a cross-sectional view of the liquid crystal display (LCD) panel of FIG. 1 according to the related art. In FIG. 2, the active area A1 functions to display images and the non-active area NA1 includes regions occupied by the gate and data pads 54 and 55 and the black matrix 65 (in FIG. 1). A black matrix 21 covers gate and data links (not shown) that are usually formed at a boundary region between the active area A1 and the non-active area NA1. A gate electrode 11 is formed in the active area A1 on a transparent first substrate 10, commonly referred to as an array substrate, with conductive metal material. In addition, a gate insulating layer 12 is formed on the transparent first substrate 10 and includes inorganic insulating materials, such as silicon oxide ($SiO_2$) and silicon nitride (SiNx). An active layer 13 and an ohmic contact layer 14 are sequentially formed on the gate insulating layer 12 in a position corresponding to the gate electrode 11. The active layer 13 is formed of amorphous silicon (a-Si:H) and the ohmic contact layer 14 is formed of impurity-doped amorphous silicon ($n^+$a-Si:H or $p^+$a-Si:H). Source and drain electrodes 15a and 15b spaced apart from each other are formed on the ohmic contact layer 14 using conductive metal materials. The gate electrode 11, the active layer 13, the ohmic contact layer 14, the source electrode 15a, and the drain electrode 15b form a thin film transistor "T," wherein the gate electrode 11 is electrically connected to the gate line 52 (in FIG. 1) and the source electrode 15a is electrically connected to the data line 53 (in FIG. 1).

A passivation layer 16 is formed on the thin film transistor "T" and an entire surface of the transparent first substrate 10 using one of silicon nitride (SiNx) and silicon oxide ($SiO_2$). Then, a drain contact hole 16c is formed through the passivation layer 16 to expose a portion of the drain electrode 15b. A pixel electrode 17 is formed on the passivation layer 16 in a region corresponding to the pixel region, and is electrically connected to the drain electrode 15b via the drain contact hole 16c. A transparent second substrate 20, commonly referred to as a color filter substrate, is spaced apart from the transparent first substrate 10. A black matrix 21a is formed on an inner surface of the transparent second substrate 20 in a region corresponding to the thin film transistor "T" of the transparent first substrate 10. In addition, the black matrix 21 is further formed in the non-active area NA1 to cover the gate and data links.

A color filter 22 is formed beneath the black matrix 21a in the active area A1 to display red (R), green (G), and blue (B) colors, and a common electrode 23 formed of transparent conductive metal materials is formed on the color filter 22. A liquid crystal layer 30 is formed between the transparent first and second substrates 10 and 20 by injecting liquid crystal material into a space between the first and second substrates 10 and 20 and bounded by a seal pattern 40. The gate insulating layer 12 and the passivation layer 16 on the first substrate 10 are extended to the non-active area NA1 and the seal pattern 40 is formed between the first and second substrates 10 and 20 in the non-active area NA1 to maintain a cell gap between the first and second substrates 10 and 20 and to prevent the liquid crystal material from leaking out. The seal pattern 40 is formed on one of transparent first and second substrates 10 and 20 using a thermosetting resin. Then the transparent first and second substrates 10 and 20 are attached together by a thermo-compression bonding process. The liquid crystal display (LCD) device can be manufactured by a series of individual fabricating process steps including an array substrate fabricating process in which the thin film transistor "T" and the pixel electrode 17 are formed, a color filter substrate fabricating process in which the color filter 22 and the common electrode 23 are formed, and a liquid crystal cell process in which the array and color filter substrates 10 and 20 are attached together. Subsequently, the liquid crystal material is injected into the gap between the array and color filter substrates 10 and 20, and polarizers (not shown) are formed on outer sides of the array and color filter substrates 10 and 20.

The black matrix 21a is commonly formed along a boundary of each sub-color filter red (R), green (G), and blue (B) to prevent light from leaking out near the thin film transistor "T." In addition, the black matrix 21 is formed along boundaries of the active area A1 to prevent the light from leaking out in the non-active area NA1. The black matrix 21 is commonly formed of organic materials, such as carbon (C) and chromium (Cr) thin films having an optical density of above 3.5.

The seal pattern 40 serves to maintain a uniform cell gap, prevents the injected liquid crystal material from leaking out of the device, and prevents moisture and air from penetrating into a liquid crystal cell of the device. The seal pattern 40 is commonly formed of an epoxy resin, and glass fibers or spacers are commonly used together with the seal pattern 40 to maintain the uniform cell gap. The epoxy resins used for forming the seal pattern 40 are commonly required to have low hardening-contraction ratios and high degrees of purity, and be non-contaminating and dimensionally stable. The epoxy resins may be classified into thermo-hardening resins that harden by application of heat, and photo-hardening resins that harden by irradiation of ultraviolet light.

The seal pattern 40 is commonly white, and is formed on the black matrix 21 that has been previously formed along the boundary region between the active area A1 and the non-active area NA1 to attach the array and color filter substrates 10 and 20. If adhesion between the black matrix 21 and the seal pattern 40 is excellent, then the seal pattern 40 can be formed directly on the black matrix 40. However, if adhesion between the seal pattern 40 and the resin black matrix is poor, the seal pattern 40 may delaminate from the resin black matrix.

FIG. 3A is a cross-sectional view of a liquid crystal display (LCD) panel having a chromium (Cr) black matrix structure of a seal pattern forming area between upper and lower substrates according to the related art. In FIG. 3A, if chromium (Cr) materials are used for a black matrix 310 formed on an upper substrate 300, a seal pattern 320 can be formed on upper and lower substrates 300 and 340 so that the seal pattern 320 directly contacts a surface of the black matrix 310. Here, "S1" is defined as a width of the seal pattern 320, "B1" is defined as a width of the black matrix 310, and active and non-active areas A1 and NA1 are defined on the liquid crystal display (LCD) device. The non-active area NA1 includes first and second portions having widths of L1 and C1, respectively. Thus, since the seal pattern 320 is formed on the black matrix 310, the width "B1" is equal to the width L1 of the first portion.

FIG. 3B is a cross-sectional view of another liquid crystal display (LCD) panel having a resin black matrix structure of a seal pattern forming area between upper and lower substrates according to the related art. In FIG. 3B, since adhesion of a resin black matrix 360 with a seal pattern 370 is poor, the seal pattern is not formed directly on the resin black matrix 360, but is formed at the side of the resin black matrix 360. For example, the seal pattern 370 is formed outside of an area where the resin black matrix 360 is formed to prevent the seal pattern 370 from delaminating from a surface of the resin black matrix 360. Here, "S2" is defined as a width of the seal pattern 370, and "B2" is defined as a width of the resin black matrix 360. The liquid crystal display (LCD) device includes active and non-active areas A2 and NA2, wherein the non-active area NA2 includes first and second portions having widths of L2 and C2, respectively. Accordingly, since the width L2 of the first portion is equal to a sum of the width S2 of the seal pattern 370 and the width B2 of the resin black matrix, i.e., L2=S2+B2, the width L2 of the first portion (in FIG. 3B) is larger than the width L1 of the first portion (in FIG. 3A), i.e., L1 <L2. Thus, the non-active area NA2 of the liquid crystal display panel having the resin black matrix is wider than the non-active area NA1 of the liquid crystal display panel having the chromium (Cr) black matrix. In addition, since the non-active areas NA1 and NA2 are not portions that display images, they both will be covered by an upper frame after liquid crystal module (LCM) processing in which the liquid crystal module is completed by attaching a backlight and upper and lower frames to the liquid crystal display panel. Accordingly, the liquid crystal display panel having the resin black matrix is limited with regard to manufacturing small-sized and lightweight liquid crystal display (LCD) devices.

SUMMARY OF THE INVENTION

Accordingly, the present invention is directed to a liquid crystal display device having black seal pattern and external resin pattern and method of fabricating the same that substantially obviates one or more of problems due to limitations and disadvantages of the related art.

An object of the present invention is to provide a liquid crystal display (LCD) device such that a resin black matrix forming area in a non-active area is reduced to an amount of a width of a seal pattern and a black seal pattern having an optical density value of above 2.0 is formed around the resin black matrix to reduce the non-active area.

Another object of the present invention is to provide a liquid crystal display (LCD) device such that an external resin pattern is additionally formed along edges of an upper substrate to cover a portion of a rough surface of a black seal pattern, thereby preventing light leakage phenomenon near the black seal pattern.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device includes an upper substrate, a lower substrate including an active area having a plurality of thin film transistors and a non-active area, a first resin black matrix beneath the upper substrate at a position corresponding to the active area, a black seal pattern along edges of the upper substrate, and a second resin black matrix between the active area and the black seal pattern.

In another aspect, a method for fabricating a liquid crystal display (LCD) device includes forming a first resin black matrix beneath an upper substrate at a position corresponding to an active area of a lower substrate, forming a black seal pattern along edges of one of the upper substrate and the lower substrate, and forming a second resin black matrix between the active area and the black seal pattern.

In another aspect, a liquid crystal display (LCD) device includes an upper substrate, a lower substrate including an active area and a non-active area, a black seal pattern along a perimeter of the upper substrate within the non-active area, a first resin black matrix beneath the upper substrate at a position corresponding to the active area, a second resin black matrix between the active area and the black seal pattern, and an external resin pattern within the non-active area along perimeter edges of the upper substrate.

In another aspect, a method of fabricating a liquid crystal display (LCD) device includes forming a black seal pattern along a perimeter of an upper substrate within a non-active area of a first substrate, forming a first resin black matrix beneath the upper substrate at a position corresponding to an active area of the first substrate, forming a second resin black matrix between the active area and the black seal pattern, and forming an external resin pattern within the non-active area along perimeter edges of the upper substrate, wherein the external resin pattern contacts the black seal pattern and covers a surface portion of the black seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
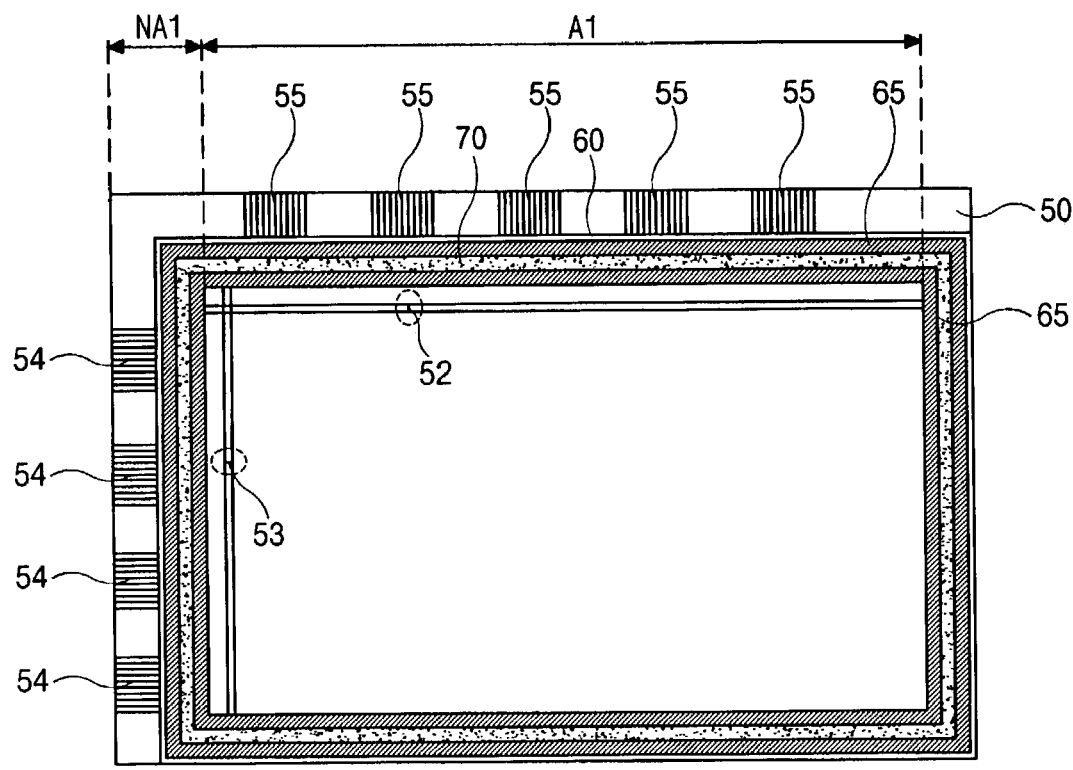
FIG. 1 is a plan view of a liquid crystal display (LCD) panel according to the related art.
Figure 2:
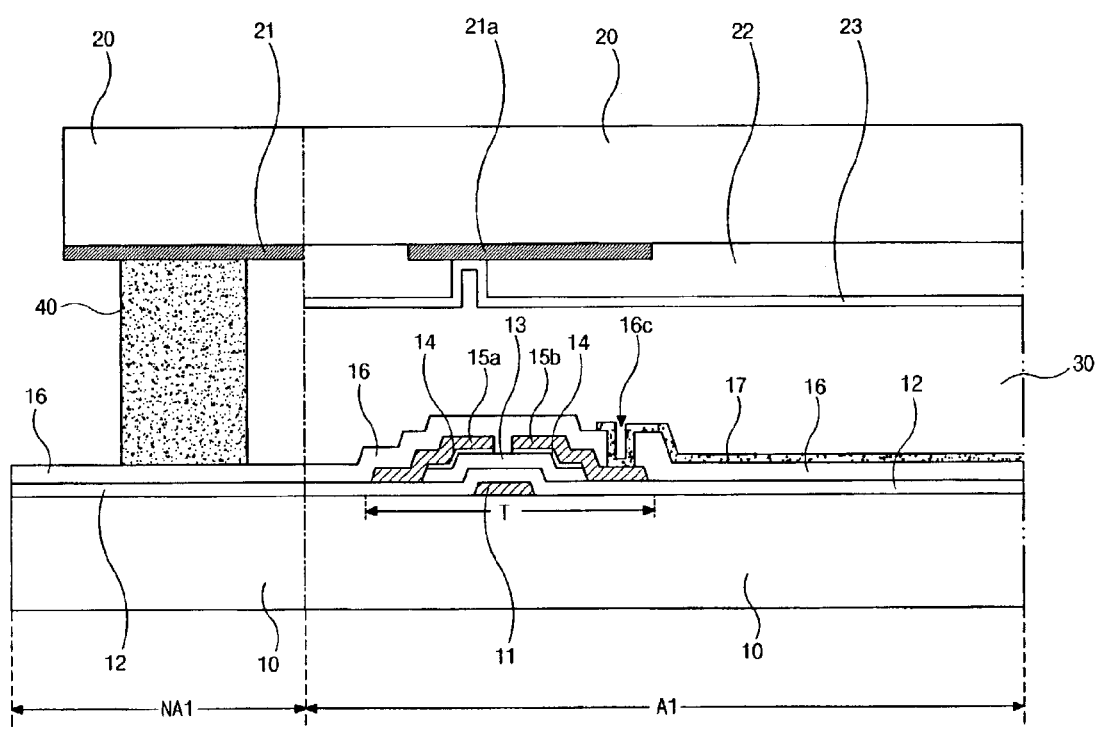
FIG. 2 is a cross-sectional view of the liquid crystal display (LCD) panel of FIG. 1 according to the related art.
Figure 3A:
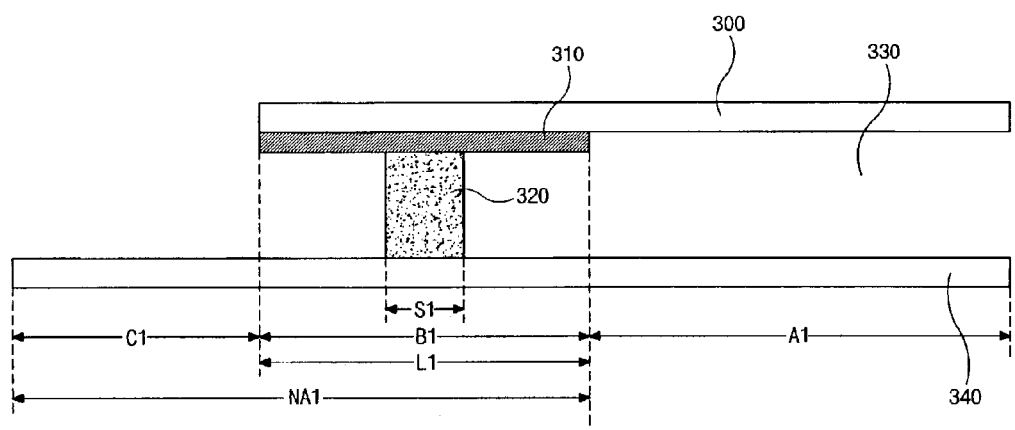
FIG. 3A is a cross-sectional view of a liquid crystal display (LCD) panel having a chromium (Cr) black matrix structure of a seal pattern forming area between upper and lower substrates according to the related art.
Figure 3B:
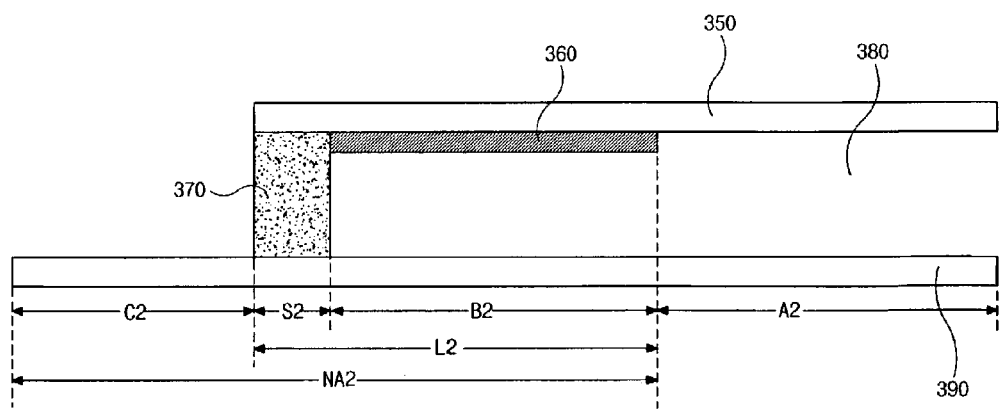
FIG. 3B is a cross-sectional view of another liquid crystal display (LCD) panel having a resin black matrix structure of a seal pattern forming area between upper and lower substrates according to the related art.
Figure 4:
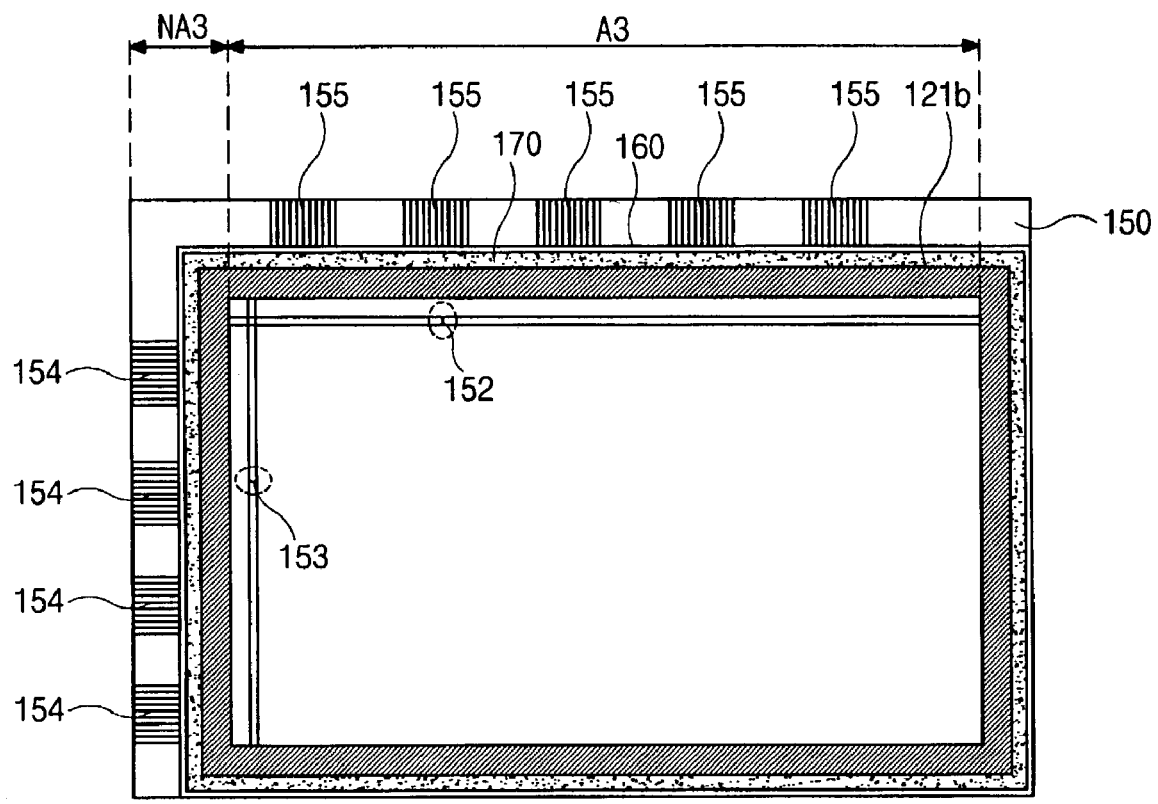
FIG. 4 is plan view of an exemplary liquid crystal display (LCD) panel having a black seal pattern around a resin black matrix according to the present invention.

FIG. 4 is plan view of an exemplary liquid crystal display (LCD) panel having a black seal pattern around a resin black matrix according to the present invention. In FIG. 4, a liquid crystal display panel may include an array substrate 150 and a color filter substrate 160 with a liquid crystal layer (not shown) interposed therebetween. Active and non-active areas A3 and NA3 may be defined on the liquid crystal display panel, and the array substrate 150 may have a wider area than the color filter substrate 160. A resin black matrix 121b may be formed around the active area A3 of the color filter substrate 160. In addition, a plurality of gate and data lines 152 and 153 may be formed in the active area A3, wherein the gate and data lines 152 and 153 may be connected to gate and data pads 154 and 155, respectively, formed in the non-active area NA3 via gate and data links, and may be covered by a resin black matrix 121b. The resin black matrix 121b within the active area A3 is not shown in FIG. 4 for the sake of explanation. A black seal pattern 170 may be formed along outer sides of the resin black matrix 121b, and liquid crystal material may be injected into an area that is bounded by the black seal pattern 170. A thin film transistor (not shown) may be formed at each intersection of the gate and data lines 152 and 153 within the active area A3. Although not shown in FIG. 4, pixel electrodes and common electrodes may be formed within the active areas A3 of the array substrate 150 and color filter substrate 160, respectively. The common and pixel electrodes may be formed within the active area A3 of one of the array and color filter substrates 150 and 160. For example, the common and pixel electrodes may be formed on the same substrate as in an in-plane switching (IPS) mode liquid crystal display (LCD) device. Thus, the common and pixel electrodes may be arranged in an alternating order with each other on the same substrate. The pixel electrode may be electrically connected to the thin film transistor (not shown), and the gate and data lines 152 and 153 may be respectively connected to the gate and data pads 154 and 155 formed in left and top margins of the array substrate 150, respectively. In addition, although not shown, the gate and data pads 154 and 155 may be electrically connected to external gate and data driving circuits, respectively.

Figure 5:
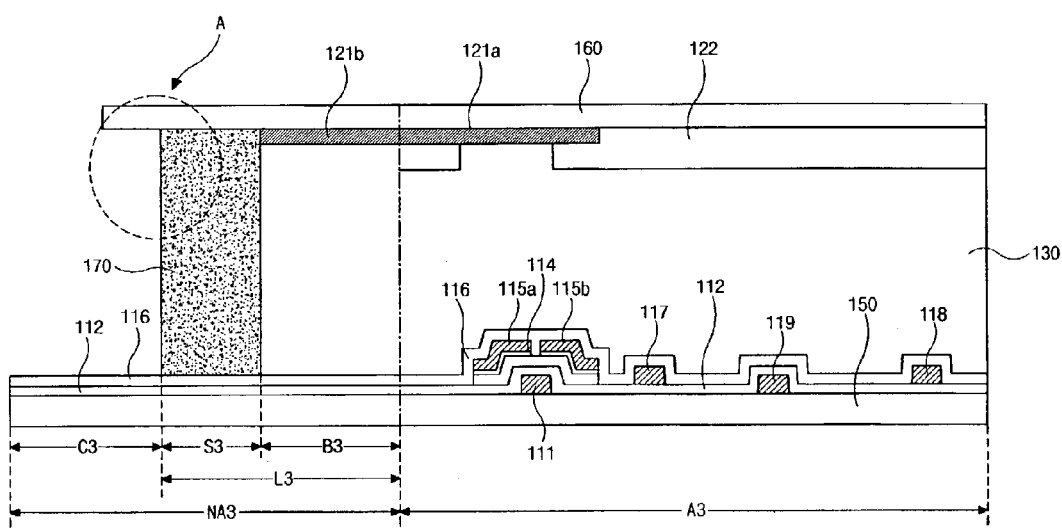
FIG. 5 is a cross-sectional view of the exemplary liquid crystal display (LCD) panel of FIG. 4 according to the present invention.

FIG. 5 is a cross-sectional view of the exemplary liquid crystal display (LCD) panel of FIG. 4 according to the present invention. In FIG. 5, a laminated structure of an in-plane switching (IPS) mode liquid crystal display panel, for example, may include a gate electrode 111, a common line (not shown), and a common electrode 119 formed by depositing conductive metal materials, such as chromium (Cr), aluminum (Al), an aluminum alloy, and molybdenum (Mo), on the array substrate 150 and patterning the deposited material. The gate electrode 111, the common line (not shown), and the common electrode 119 may be formed of a single layer structure or may be formed of a dual layer structure. A gate insulating layer 112 may be subsequently formed on an entire surface of the array substrate 150 on which the gate electrode 111, the common line (not shown), and the common electrode 119 have been previously formed.

An active layer 113 and an ohmic contact layer 114 may be sequentially formed by depositing amorphous silicon and impurity-doped amorphous silicon on the gate insulating layer 112, and then patterning the amorphous silicon and the impurity-doped amorphous silicon. The gate insulating layer 112 may be formed of inorganic insulating materials, such as silicon nitride ($SiN_x$) and silicon oxide ($SiO_2$), or of organic insulating materials.

A data line (not shown) and source and drain electrodes 115a and 115b may be formed by depositing conductive metal materials on the ohmic contact layer 114, and then patterning the deposited material. In addition, pixel electrodes 117 and 118 may also be formed on the gate insulating layer 112 using the same metal materials as those used to form the source and drain electrodes 115a and 115b.

A passivation layer 116 may be subsequently formed by depositing inorganic insulating materials, such as silicon nitride (SiNx) and silicon oxide (SiO$_2$), or organic insulating materials. A resin black matrix 121a may be formed on the color filter substrate 160 at a position corresponding to the thin film transistor to prevent light from penetrating into the thin film transistor. A color filter 122 may be formed on the resin black matrix 121a to display color images, and an overcoat layer (not shown) may further be formed on the resin black matrix 121a and the color filter 122 to remove any steps generated by the color filter 122.

A liquid crystal layer 130 may be interposed between the array and color filter substrates 150 and 160. In addition, the resin black matrix 121b may be formed along a boundary of the active and non-active areas A3 and NA3, and the seal pattern 170 may be formed between one of the array and color filter substrates 150 and 160. Accordingly, a width of the non-active area NA3 may be reduced by reducing a width B3 of the resin black matrix 121b. Here, the liquid crystal molecules of the liquid crystal layer 130 may be abnormally aligned in the first portion of the non-active area NA3, and the gate and data links may be formed in the first portion of the non-active area NA3. Accordingly, the first portion having a width L3 should be covered with the resin black matrix 112b.

Moreover, the width B3 of the resin black matrix 121b may be reduced to an amount of the width S3 of the seal pattern 170. The seal pattern 170 may be formed of a black material having the width S3 and optical density of above 2.0, and may be formed at outer sides of the resin black matrix 121b without a spaced area between the resin black matrix 121b and the seal pattern 170. Accordingly, the black seal pattern 170 may function as a black matrix as well as function as a seal pattern to attach the array and color filter substrates 150 and 160. In addition, the non-active area NA1 that does not actually contribute to image display may be reduced, and the liquid crystal display panel may be manufactured to a efficient size that minimizes unnecessary portions of the liquid crystal display panel.

For example, the liquid crystal display panel may include the active and non-active areas A3 and NA3, wherein the non-active area NA3 includes a first portion having a width L3 and a second portion having a width C3. The first portion L3 may include a first sub-portion that corresponds to the resin black matrix 121b having a width B3 and a second sub-portion that corresponds to the black seal pattern 170 having a width S3. The second portion having the width C3 may be for forming the gate and data pads 154 and 155 (in FIG. 5). The width L3 of the first portion of the non-active area NA3 may be equal to a sum of the width B3 of the resin black matrix 121b and the width S3 of the black seal pattern 170, i.e., L3=B3+S3.

The non-active area NA3 may be covered by an upper frame such that only the active area A3 is exposed after liquid crystal module processing in which a backlight and upper and lower frames (not shown) are attached to the liquid crystal display panel to complete a liquid crystal display (LCD) device. Accordingly, as the non-active area NA3 becomes larger on condition that a size of the active area A3 is fixed to a certain value, total size and weight of the liquid crystal display (LCD) device increases.

The black seal pattern 170 may be formed on one of the array and color filter substrates 150 and 160 by a screen-printing method or a dispensing method. Then, the black seal pattern 170 may undergo a hardening process. For example the width S3 of the black seal pattern 170 may be between about 0.5 mm and about 2.0 mm, and a color of the black seal pattern 170 may be black and the optical density of the black seal pattern 170 may be above about 2.0.

Although the present invention may provide a liquid crystal display panel having a minimized non-active area when the resin material is used for the black matrix, the black seal pattern 170 may have a rough surface so that light may leak out along the rough surface from a backlight disposed behind the liquid crystal display panel.

Figure 6:
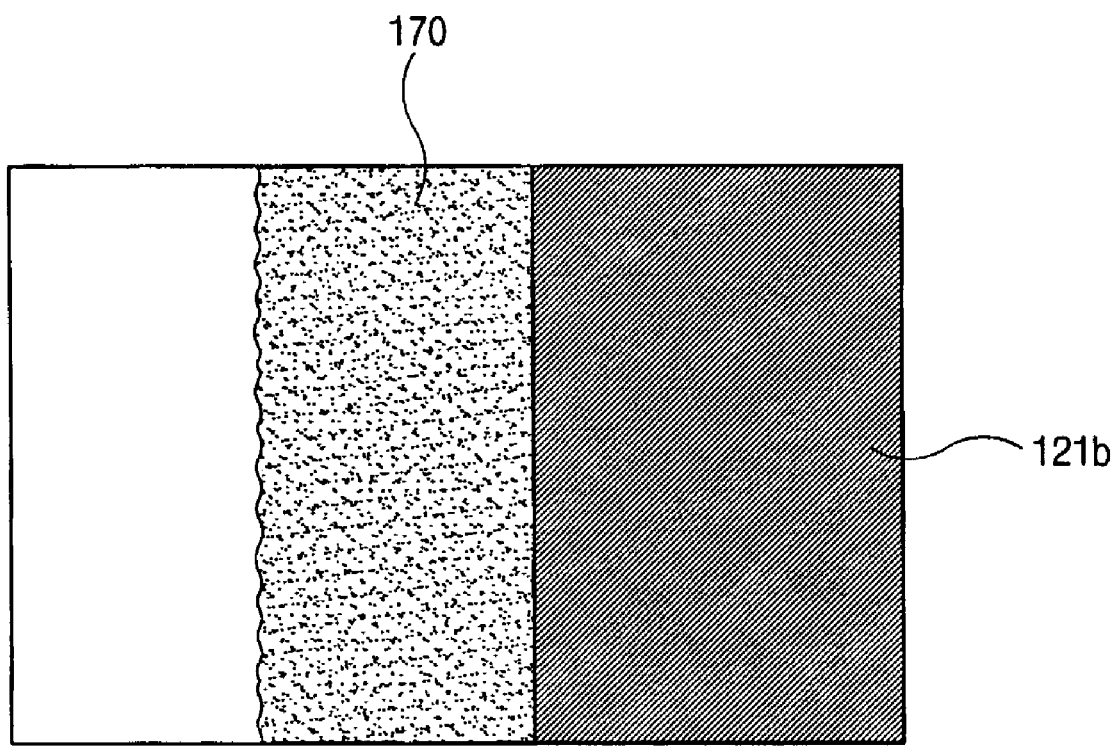
FIG. 6 is an expanded view of portion "A" of FIG. 5 according to the present invention.

FIG. 6 is an expanded view of portion "A" of FIG. 5 according to the present invention. In FIG. 6, the black seal pattern 170 may have a rough surface after it is formed on one of the array and color filter substrates 150 and 160. If the color filter and array substrates 160 and 150 are attached at exact alignment, then the rough surface of the black seal pattern 170 may not be problematic. However, since an alignment margin exists between the array and color filter substrates 150 and 160, the rough surface of the black seal pattern 170 may be resolved. For example, if the array and color filter substrates 150 and 160 are not exactly aligned, light leakage phenomenon may result along the rough surface of the black seal pattern 170. In addition, instrumental error may occur during a liquid crystal module (LCM) process in which upper and lower frames (not shown) and the backlight are attached to a liquid crystal display panel to complete the liquid crystal display (LCD) device. Accordingly, the light leakage phenomenon may result along the rough surface of the black seal pattern 170. Thus, the rough surface of the black seal pattern 170 may need to be smoothed. Therefore, the rough surface of the black seal pattern 170 may be smoothed by covering a portion of the rough surface of the black seal pattern 170 with a same resin material as the resin black matrix 121b.

Figure 7A:
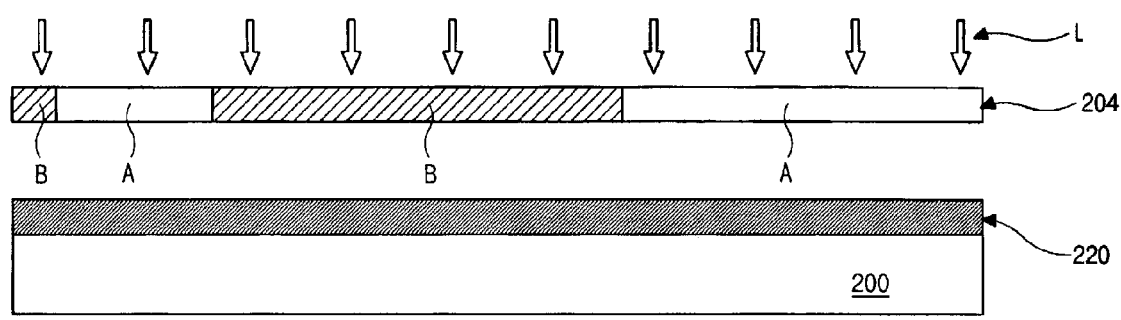
FIGS. 7A to 7C are cross-sectional views of an exemplary fabricating process for forming a resin external pattern according to the present invention.
Figure 7B:
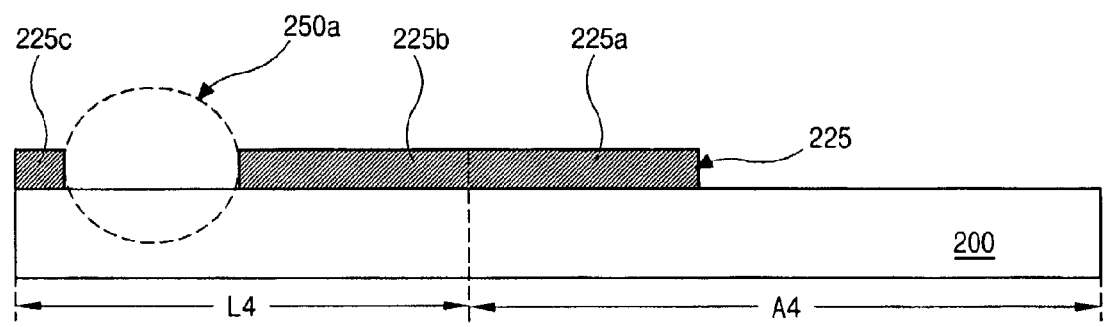
Figure 7C:
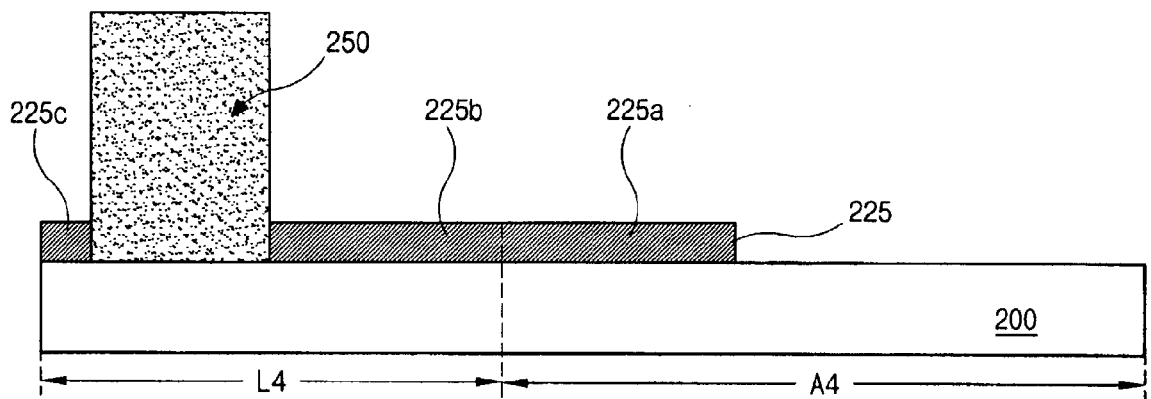

FIGS. 7A to 7C are cross-sectional views of an exemplary fabricating process for forming a resin external pattern according to the present invention. In FIG. 7A, a resin film 220 may be formed on a transparent substrate 200 with photosensitive black organic material, for example. The resin film 220 may be a positive-type or a negative-type. In case of the positive-type resin film, a portion of the resin film 220 that is exposed to light may be removed after development. In case of the negative-type resin film, a portion of the resin film 220 that is not exposed to the light may be removed after development. The positive-type resin film 220 is selected for explanation purposes. A mask 204 having a light-transmission portion "A" and a light-shielding portion "B" may be disposed over the resin film 220. Then, light "L" may be subsequently irradiated onto the mask 204.

In FIG. 7B, a resin black matrix 225 may be formed by irradiating the light onto a first portion of the resin film 220 through the mask 204 (in FIG. 7A), and then developing the first portion of the resin film 220 that is exposed to the light. If the resin material is used for forming the black matrix, a forming process of the black matrix is relatively simple as compared to a forming process of a black matrix that includes chromium (Cr). Accordingly, the resin black matrix 225 can be simply formed by a series of processes, such as coating a photosensitive black organic material on the substrate 200, irradiating light onto the photosensitive black organic material, and then developing the photosensitive black organic material. Thus, an additional etching process is unnecessary for the resin black matrix forming process. Here, the resin black matrix 225 may not be formed on an area 250a where a black seal pattern 250 (in FIG. 7C) will be formed later during a liquid crystal process. In addition, a resin black matrix 225c is an external resin pattern that will cover a rough surface portion of the black seal pattern 250 (in FIG. 7C).

In FIG. 7C, the resin black matrix 225 and the black seal pattern 250 may be formed on the substrate 200. The black seal pattern 250 may be formed during a liquid crystal process by a screen-printing method or a dispensing method, for example. The black seal pattern 250 may be formed within the area 250a (in FIG. 7B).

Figure 8:
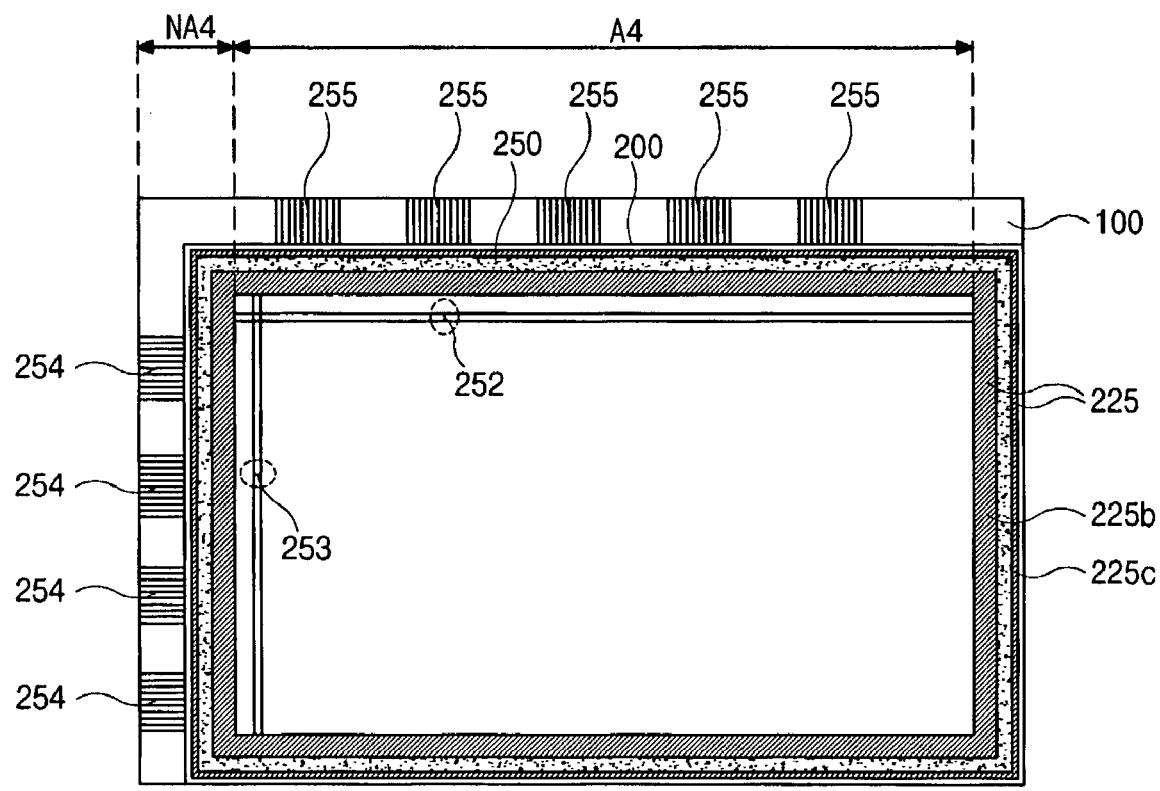
FIG. 8 is a plan view of an exemplary liquid crystal display (LCD) panel having a resin external pattern according to the present invention.

FIG. 8 is a plan view of an exemplary liquid crystal display (LCD) panel having a resin external pattern according to the present invention. In FIG. 8, an active area A4 and a non-active area NA4 may be defined on a liquid crystal display panel. The liquid crystal display panel may include an upper substrate 200 and a lower substrate 100, wherein the lower substrate 100 may have a wider area than the upper substrate 200. A resin black matrix 225 may be formed around the active area A4, and a resin black matrix may be formed within the active area A4, but has been omitted for the convenience of explanation. For example, the resin black matrix 225b having a certain width may be formed along a boundary between the active area A4 and the non-active area NA4. A black seal pattern 250 may then be formed around the resin black matrix 225b without an interval between the resin black matrix 225b and the black seal pattern 250.

Although not shown, a liquid crystal material may be injected into a space formed by the black seal pattern 250 disposed between the lower and upper substrates 100 and 200. The liquid crystal layer (not shown) may be formed by a vacuum injection method or a liquid crystal dispensing method, for example. A resin external pattern 225c may be formed at an outer side of the black seal pattern 250 to cover a portion of the black seal pattern 250. A plurality of gate and data lines 252 and 253 may be formed in the active area A4, wherein the gate line 252 is formed along a first direction and the data line 253 is formed along a second direction perpendicular to the first direction. The gate and data lines 252 and 253 cross each other, thereby defining a pixel region (not shown), and a thin film transistor may be formed near each intersection of the gate and data lines 252 and 253. Although not shown, if the liquid crystal display panel is an in-plane switching (IPS) mode liquid crystal display (LCD) panel, a common line, a plurality of common electrodes, and a plurality of pixel electrodes may further be formed in the active area A4. The common electrodes (not shown) may extend from the common line (not shown), and the pixel electrodes (not shown) may be connected to the thin film transistor and may be arranged in an alternating order with the common electrodes spaced apart from the pixel electrodes.

Gate and data pads 254 and 255 may be formed in marginal spaces of the array substrate 100, and may be electrically connected to the gate and data lines 252 and 253 via gate and data links (not shown), respectively.

Figure 9:
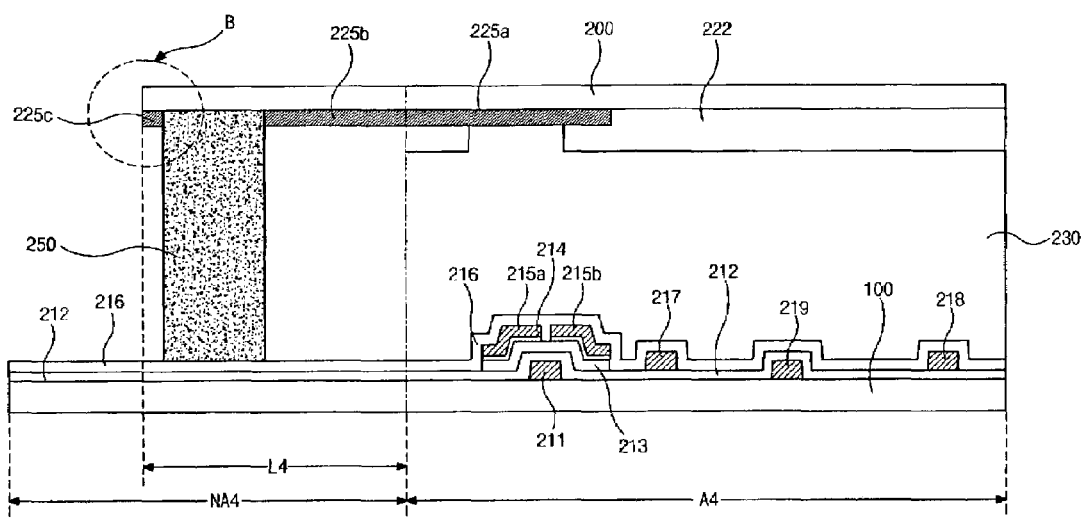
FIG. 9 is a cross-sectional view of the exemplary liquid crystal display (LCD) panel of FIG. 8 according to the present invention.

FIG. 9 is a cross-sectional view of the exemplary liquid crystal display (LCD) panel of FIG. 8 according to the present invention. In FIG. 9, a gate electrode, a common line (not shown), and a common electrode 219 may be formed by depositing conductive metal materials on the lower substrate 100, and then may be patterned. A gate insulating layer 212 may be formed on an entire surface of the lower substrate 100 upon which the gate electrode 211, the common line, and the common electrode 219 may be already formed. An active layer 213 and an ohmic contact layer 214 may be subsequently formed on the gate insulating layer 212 in a position corresponding to the gate electrode 211 by sequentially depositing amorphous silicon and impurity-doped amorphous silicon on the gate insulating layer 212. A data line (not shown) and source and drain electrodes 215a and 215b may be formed on the ohmic contact layer 214 with conductive metal materials. In addition, the pixel electrodes 217 and 218 that are arranged in an alternating order with the common electrodes may be formed simultaneously with the source and drain electrodes 215a and 215b using the same conductive metal materials as the source and drain electrodes 215a and 215b.

A passivation layer 216 may be formed by depositing an inorganic insulating material, such as silicon nitride (SiNx) and silicon oxide ($SiO_2$), or an organic insulating material. A resin black matrix 225a may be formed in the active area A4 of the upper substrate 200 to intercept any light that may leak into the thin film transistor and the gate and data lines 252 and 253. A resin black matrix 225b may be formed on the upper substrate 200 in a region between a black seal pattern 250 and the active area A4. In addition, an external resin pattern 225c may be formed on the upper substrate 200 at an outer side of the black seal pattern 250 to prevent light from a backlight from leaking out along the rough surface of the black seal pattern 250 by covering a portion of the rough surface of the black seal pattern 250. A color filter 222 may be formed beneath the resin black matrix 225a in the active area A4 and the upper substrate 200.

An overcoat layer (not shown) may be formed beneath the color filter 222 to remove any steps generated by the color filter 222, and a liquid crystal material layer 230 may be formed between the lower and upper substrates 100 and 200. The external resin pattern 225c that may be formed along an edge portion of the upper substrate 200 without an interval between the black seal pattern 250 and the external resin pattern 225c may cover the rough surface of the black seal pattern 250 so that the light from the backlight cannot leak out of the liquid crystal display panel.

A width L4 of a first portion of the non-active area NA4 in FIG. 9 may increase as compared to the width L3 of the first portion of the non-active area NA3 (in FIG. 5) due to an formation of the external resin pattern 225c in the first portion of the non-active area NA4. However, the increase of the width L4 of the first portion may be minimized by reducing a width of the external resin pattern 225c to cover the portion of the rough surface of the black seal pattern 250.

Figure 10:
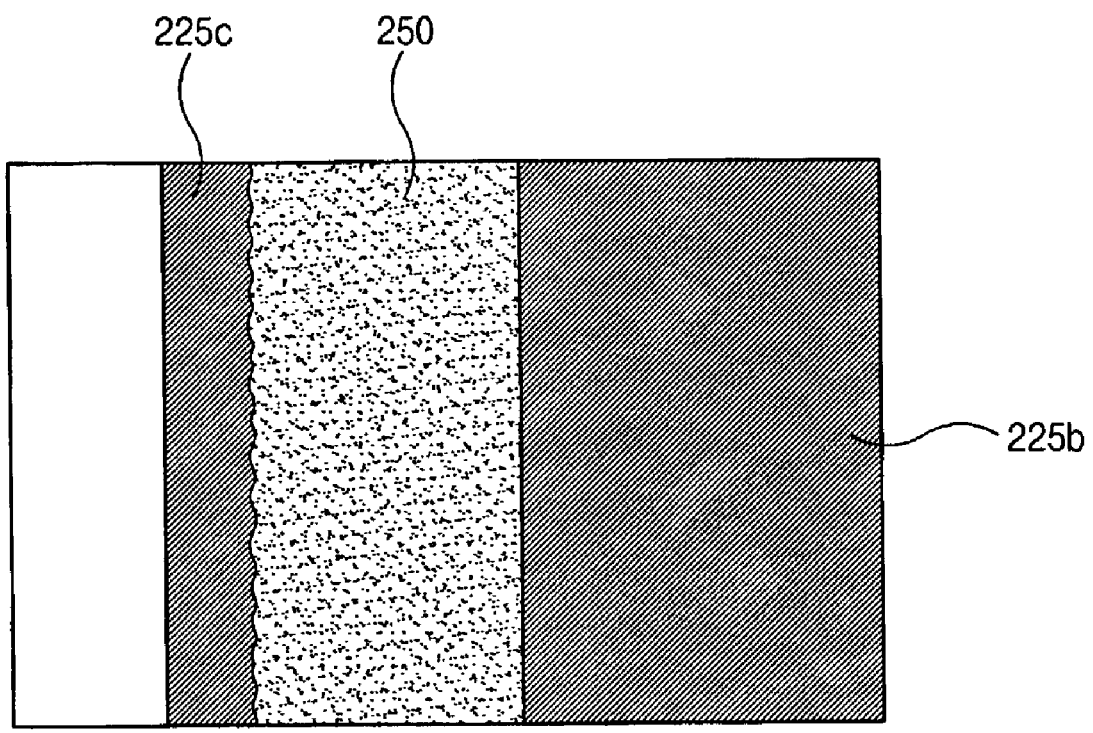
FIG. 10 is an expanded view of portion "B" of FIG. 9 according to the present invention.

FIG. 10 is an expanded view of portion "B" of FIG. 9 according to the present invention. In FIG. 10, since the external resin pattern 225 may be formed at the outer surface of the black seal pattern 250 to contact the rough surface of the black seal pattern 250, the light from the backlight cannot leak along the rough surface of the black seal pattern 250. Accordingly, even when there exists a minor instrumental defect generated during a liquid crystal module (LCM) process in which the liquid crystal display panel is attached to upper and lower frames (not shown), the light leakage that leaks from the rough surface of the black seal pattern 250 may be prevented.

It will be apparent to those skilled in the art that various modifications and variation can be made in the liquid crystal display device having black seal pattern and external resin pattern and method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising: an upper substrate;
   a lower substrate including an active area having a plurality of thin film transistors and a non-active area;
   a first resin black matrix beneath the upper substrate at a position corresponding to the active area;
   a black seal pattern directly contacting the upper substrate along edges of the upper substrate; and
   a second resin black matrix between the active area and the black seal pattern, wherein the second resin black matrix directly contacts a side portion of the black seal pattern.

2. The device according to claim 1, further comprising an external resin pattern along edges of the upper substrate, wherein the external resin pattern contacts the black seal pattern and covers a surface portion of the black seal pattern.

3. The device according to claim 1, wherein the black seal pattern has an optical density value of above about 2.0.

4. The device according to claim 1, wherein the lower substrate includes a pixel electrode and the upper substrate includes a common electrode.

5. The device according to claim 1, wherein the lower substrate includes common and pixel electrodes.

6. The device according to claim 1, wherein the black seal pattern has a width between about 0.5 mm and about 2.0 mm.

7. The device according to claim 1, wherein the black seal pattern is formed on the lower substrate.

8. A method for fabricating a liquid crystal display (LCD) device, comprising:
   forming a first resin black matrix beneath an upper substrate at a position corresponding to an active area of a lower substrate;
   forming a black seal pattern along edges of one of the upper substrate and the lower substrate such that the black seal pattern directly contacts the upper substrate; and
   forming a second resin black matrix between the active area and the black seal pattern, wherein the second resin black matrix directly contacts a side portion of the black seal pattern.

9. The method according to claim 8, further comprising forming an external resin pattern along edges of the upper substrate, wherein the external resin pattern contacts another side portion of the black seal pattern.

10. The method according to claim 8, wherein the black seal pattern has an optical density value of above about 2.0.

11. The method according to claim 8, wherein the lower substrate includes a pixel electrode and the upper substrate includes a common electrode.

12. The method according to claim 8, wherein the lower substrate includes common and pixel electrodes.

13. The method according to claim 8, wherein the black seal pattern has a width between about 0.5 mm and about 2.0 mm.

14. The method according to claim 8, wherein the black seal pattern is formed on the upper substrate.

15. The method according to claim 8, wherein the black seal pattern is formed on the lower substrate.

16. A liquid crystal display (LCD) device, comprising: an upper substrate;
   a lower substrate including an active area and a non-active area;
   a black seal pattern directly contacting the upper substrate along a perimeter of the upper substrate within the non-active area;
   a first resin black matrix beneath the upper substrate at a position corresponding to the active area;
   a second resin black matrix between the active area and the black seal pattern; and
   an external resin pattern within the non-active area along perimeter edges of the upper substrate, the external resin pattern directly contacts the black seal pattern,
   wherein the black seal pattern is disposed between the second resin black matrix and the external resin pattern.

17. A method of fabricating a liquid crystal display (LCD) device, comprising:
   forming a black seal pattern along a perimeter of an upper substrate within a non-active area of a first substrate such that the black seal pattern directly contacts the upper substrate; forming a first resin black matrix beneath the upper substrate at a position corresponding to an active area of the first substrate;
   forming a second resin black matrix between the active area and the black seal pattern; and
   forming an external resin pattern within the non-active area along perimeter edges of the upper substrate, the external resin pattern directly contacts the black seal pattern,
   wherein the black seal pattern is disposed between the second resin black matrix and the external resin pattern.

18. A liquid crystal display (LCD) device, comprising: an upper substrate;
   a lower substrate including an active area having a plurality of thin film transistors and a non-active area;
   a first resin black matrix on the upper substrate at a position corresponding to the active area;
   a black seal pattern along edges of the upper substrate, the black seal pattern having a first surface for connecting to the upper substrate and second and third surfaces; and a second resin black matrix between the active area and the black seal pattern,
   wherein the second resin black matrix directly contacts only a portion of the second surface of the black seal pattern.

19. The device according to claim 18, further comprising an external resin pattern along the edges of the upper substrate, wherein the external resin pattern contacts a portion of the third surface of the black seal pattern.

20. The device according to claim 18, wherein the black seal pattern has an optical density value of above about 2.0.

21. A method for fabricating a liquid crystal display (LCD) device, comprising:
   forming a first resin black matrix beneath an upper substrate at a position corresponding to an active area of a lower substrate;
   forming a black seal pattern along edges of one of the upper substrate and the lower substrate, the black seal pattern having a first surface for connecting to the upper substrate and second and third surfaces; and
   forming a second resin black matrix between the active area and the black seal pattern, wherein the second resin black matrix directly contacts only a portion of the second surface of the black seal pattern.

22. The method of claim 21 further comprising:
   forming an external resin pattern within a non-active area along the edges of the upper substrate, wherein the external resin pattern directly contacts a portion of the third surface of the black seal pattern.

* * * * *